United States Patent
Yoon et al.

(10) Patent No.: US 8,086,290 B2
(45) Date of Patent: Dec. 27, 2011

(54) MOBILE PHONE WITH A SLIDING CRADLE FOR PROVIDING VISUAL AND ACOUSTIC CONVENIENCE

(75) Inventors: Yoo-Seok Yoon, Seoul (KR); Soo-Ik Jung, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1511 days.

(21) Appl. No.: 11/516,554

(22) Filed: Sep. 7, 2006

(65) Prior Publication Data

US 2007/0105606 A1 May 10, 2007

(30) Foreign Application Priority Data

Nov. 7, 2005 (KR) .................. 10-2005-0105948

(51) Int. Cl.
*H04M 1/00* (2006.01)
(52) U.S. Cl. ............... 455/575.4; 455/575.1; 455/575.3; 379/433.04; 379/433.12; 379/433.13; 361/679.02; 361/679.06; 361/679.12
(58) Field of Classification Search ............... 455/575.4, 455/575.1, 575.3; 379/433.04, 433.12, 433.13; 361/679.02, 679.06, 679.12
See application file for complete search history.

(56) References Cited

U.S. PATENT DOCUMENTS

| | | | |
|---|---|---|---|
| 6,822,871 B2 * | 11/2004 | Lee et al. .................. | 361/727 |
| 7,107,084 B2 * | 9/2006 | Duarte et al. .............. | 455/575.3 |
| 2004/0085739 A1 | 5/2004 | Lee | |
| 2005/0044665 A1 * | 3/2005 | Kuramochi .................. | 16/341 |

FOREIGN PATENT DOCUMENTS

| | | |
|---|---|---|
| CN | 1503541 | 6/2004 |
| CN | 1592564 | 3/2005 |
| EP | 1312999 | 5/2003 |
| EP | 1422911 | 5/2004 |
| EP | 1439685 | 7/2004 |
| KR | 10-2004-0104878 | 12/2004 |
| KR | 10-2005-0079119 | 8/2005 |
| TW | 263698 | 5/2005 |

* cited by examiner

*Primary Examiner* — Tuan H Nguyen
(74) *Attorney, Agent, or Firm* — Roylance, Abrams, Berdo & Goodman, L.L.P.

(57) ABSTRACT

A sliding cradle in a mobile terminal has a body housing, and a sliding and pivotable housing adapted to rest in a slanting position on the body housing after being slid on the body housing. The sliding cradle comprises a first member fastened to the body housing, a second member fastened to the sliding and pivotable housing, and a sliding guide part arranged between the first and second members to guide the sliding movement of the sliding and pivotable housing. The sliding guide part has a pivot for pivoting the second member apart from the first member. A fixture member is fastened to the first member to face the sliding guide part. A pivot control device is connected to the first and second members to substantially prevent the sliding and pivotable housing from pivoting during the sliding movement and to enable the sliding and pivotable housing to pivot upon completion of the sliding movement.

12 Claims, 7 Drawing Sheets

MOBILE PHONE WITH A SLIDING CRADLE FOR PROVIDING VISUAL AND ACOUSTIC CONVENIENCE

CROSS REFERENCE TO RELATED APPLICATION

This application claims priority under 35 U.S.C. §119(a) to an application entitled "Mobile Phone with a Sliding Cradle for Providing Visual and Acoustic Convenience" filed in the Korean Intellectual Property Office on Nov. 7, 2005 and assigned Serial No. 2005-105948, the entire contents of which are hereby incorporated by reference.

BACKGROUND OF THE INVENTION

1. Field of the Invention

The present invention relates to a mobile terminal, such as a digital multimedia broadcasting (DMB) phone, game phone, chatting phone, camera phone, MP3 phone, cellular phone, personal communications system (PCS), personal digital assistant (PDA), and hand held phone (HHP). More particularly, the present invention relates to a housing structure thereof.

2. Description of the Related Art

Originally, the mobile terminal was meant to enable the user to communicate with others through radio communications. Recently, the mobile terminal has been developed to accommodate various needs for the multimedia and internet environment, in addition to voice communication. Additionally, it has become more compact, lighter, and slimmer. The conventional mobile terminals may be classified into bar-type, flip-type, and folder-type terminals according to the external housing structure. The bar-type has a single bar-like housing. The flip-type has a flip hinged on the bar-like housing. The folder-type has a folder hinged on the bar-like housing. According to other classifications, there are the so-called neck wearable-type worn on the neck and the wrist-type worn on the wrist. Additionally, the mobile terminals may be classified into the so-called rotation-type and the sliding-type. The rotation-type has a two housing parts that may be turned relative to each other for opening or closing without breaking their face-to-face contacting relationship. The sliding-type has two housing parts that may be slid longitudinally relative to each other for opening or closing. Meanwhile, the mobile terminal has been developed to exchange large amounts of data at high speeds.

Such conventional mobile terminals have suffered the following drawbacks. For example, when the user wishes to watch the display of the mobile terminal rested on a table, it is desirable to have an additional support for supporting the mobile terminal in a slanting position for improving the visual angle. Moreover, when the user wishes to enjoy a moving picture displayed on the screen of the mobile terminal rested on a table, he must be satisfied both visually and acoustically. Thus, it is very important to support the mobile terminal in a slanting position because both visual and acoustic effects may be most intensified in that position.

Accordingly, a need exists for an improved mobile terminal having an improved housing structure.

SUMMARY OF THE INVENTION

It is an object of the exemplary embodiments of the present invention to provide a mobile terminal with a sliding cradle for providing visual and acoustic convenience.

It is another object of the exemplary embodiments of the present invention to provide a mobile terminal with a sliding cradle for providing visual and acoustic convenience in the digital multimedia broadcasting (DMB) mode.

It is still another object of the exemplary embodiments of the present invention to provide a mobile terminal with a sliding cradle for enabling the display and the speaker device to be rested in a transversely slanting position on a table to provide improved visual and acoustic effects of a moving picture displayed on the screen.

It is a further object of the exemplary embodiments of the present invention to provide a mobile terminal with a display whose screen is protruded relative to the surrounding surface to facilitate a user concentrating on the information displayed thereon, and a sliding cradle for supporting the mobile terminal.

It is further another object of the exemplary embodiments of the present invention to provide a mobile terminal with a sliding cradle, wherein the sliding cradle is always concealed from view regardless of the sliding cradle being operated or not.

It is still a further object of the exemplary embodiments of the present invention to provide a mobile terminal with a sliding cradle for enabling the mobile terminal to be automatically pivoted to a slanting position after being opened by a semi-automatic sliding motion.

According to an aspect of the exemplary embodiments of the present invention, a mobile terminal for providing visual and acoustic convenience comprises a body housing provided with a plurality of first keys, a sliding and pivotable housing provided with a plurality of second keys, at least one speaker device, and a display. The sliding and pivotable housing is adapted to be slid on the body housing. When the sliding and pivotable housing is slid by an external force to a predetermined distance toward an ending position to expose the first keys, a first resilient member begins to exert a resilient force to make the sliding and pivotable housing automatically move to the ending position where the sliding and pivotable housing is pivoted to make the display rest in a slanting position on the body housing.

According to another aspect of the exemplary embodiments of the present invention, a mobile terminal has a body housing, and a sliding and pivotable housing adapted to rest in a slanting position on the body housing after being slid on the body housing. A sliding cradle for the mobile terminal comprises a first member fastened to the body housing, and a second member fastened to the sliding and pivotable housing. A sliding guide part is arranged between the first and second members to guide the sliding movement of the sliding and pivotable housing. The sliding guide has a pivot for pivoting the second member apart from the first member. A fixture member is connected to the first member to face the sliding guide part. A pivot control device is connected with the first and second members to substantially prevent the sliding and pivotable housing from pivoting during the sliding movement and to enable it to pivot upon completion of the sliding movement.

Other objects, advantages and salient features of the invention will become apparent from the following detailed description, which, taken in conjunction with the annexed drawings, discloses exemplary embodiments of the invention.

BRIEF DESCRIPTION OF THE DRAWINGS

The above and other objects, features and advantages of the exemplary embodiments of the present invention will become more apparent from the following detailed description when taken in conjunction with the accompanying drawing in which.

Throughout the drawings, like reference numerals will be understood to refer to like parts, components and structures.

DETAILED DESCRIPTION OF EXEMPLARY EMBODIMENTS

Exemplary embodiments of the present invention are described herein below with reference to the accompanying drawings. In the following description, well-known functions or constructions are not described in detail because they would obscure the invention in unnecessary detail.

Figure 1:
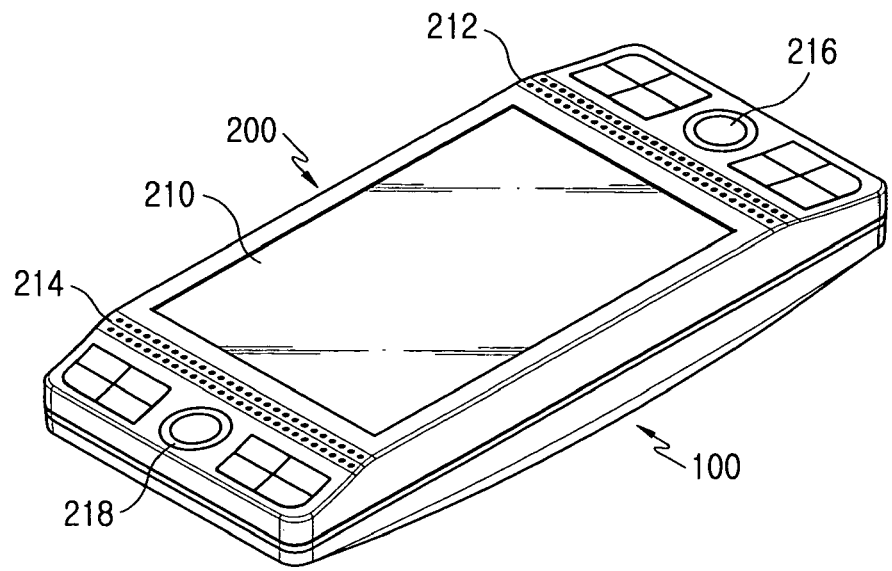
FIG. 1 is a perspective view of a mobile terminal provided with a sliding cradle according to an exemplary embodiment of the present invention.
Figure 2:
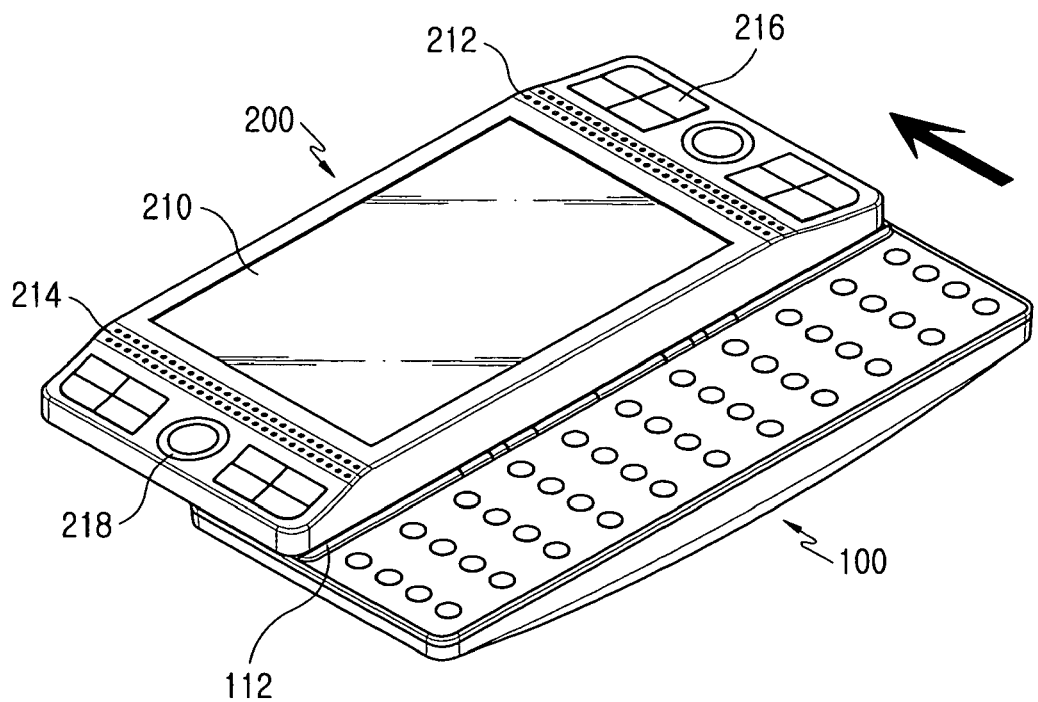
FIG. 2 is a perspective view of a mobile terminal illustrating a sliding and pivotable housing slid relative to a body housing according to an exemplary embodiment of the present invention.
Figure 3:
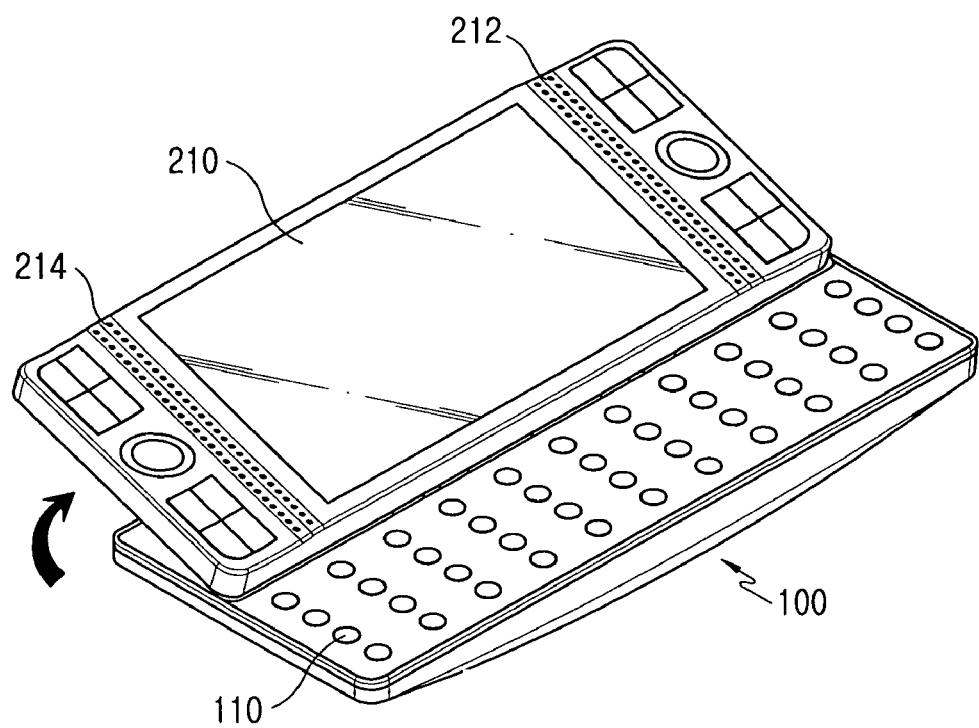
FIG. 3 is a perspective view of a mobile terminal illustrating a sliding and pivotable housing rested in a slanting position on a body housing after sliding movement thereof according to an exemplary embodiment of the present invention.

Referring to FIGS. 1 to 3, the mobile terminal, such as a mobile phone, according to exemplary embodiments of the present invention comprises a body housing 100, and a sliding and pivotable housing 200 designed to be matched with the body housing. More specifically, the sliding and pivotable housing 200 is designed to first be slid face-to-face on the body housing 100 (FIG. 2), and then to be pivoted to a slanting position on the body housing 100 (FIG. 3). The body housing 100 is provided with a plurality of first keys 110. The sliding and pivotable housing 200 has a plurality of second keys 216 and 218. The mobile terminal has at least one speaker device, as shown for example in FIGS. 1-3 illustrating an implementation using a plurality of speaker devices 212 and 214. FIG. 2 shows the sliding and pivotable housing 200 slid to a given distance, and FIG. 3 shows the sliding and pivotable housing 200 in a slanting position after the sliding movement.

The sliding and pivotable housing 200 encases a display 210, first and second speaker devices 212 and 214 arranged at both sides of the display 210, and first and second keypads 216 and 218 arranged at the respective sides of the first and second speaker devices 212 and 214. Thus, the first and second speaker devices 212 and 214 intensify the acoustic effect at both sides of the display 210, and the first and second keypads 216 and 218 facilitate the user's operation of the keys while watching the display 210. The display 210 may be an LCD or a touch screen, and the screen is designed to protrude by a given thickness from the surface of the first and second keypads 216 and 218 to facilitate a user's concentration on the display. Accordingly, the first and second speaker devices 212 and 214 and the display 210 preferably directly face the user to enable the user to enjoy the visual and acoustic effects more effectively.

The body housing 100 has the first keys 110 arranged in the QWERTY scheme on its surface, and a transverse groove 112 for accommodating the pivoting of the sliding and pivotable housing. The transverse groove 112 is formed along the direction substantially perpendicular to the sliding direction of the sliding and pivotable housing 200 and lengthwise of the body housing 100.

The position of the mobile terminal as shown in FIG. 1 is suitable for the phone or MP3 mode, and that of FIG. 2 for the game or chatting mode, and that of FIG. 3 for the DMB mode. The position of the mobile terminal shown in FIG. 3 enables the user to enjoy the visual and acoustic effects more effectively because the display and speakers rested in a slanting position directly face the user.

Figure 4:
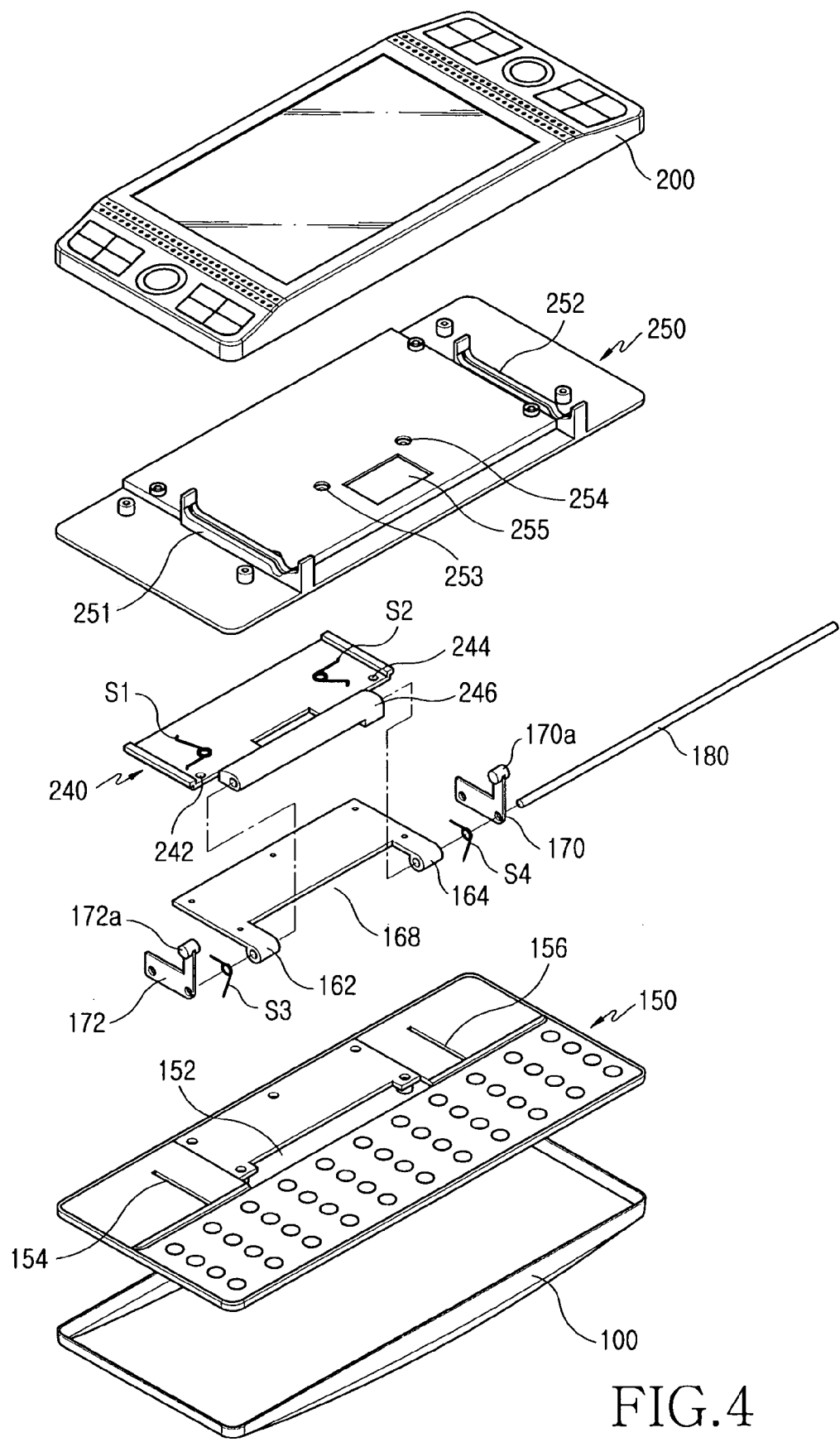
FIG. 4 is an exploded perspective view of sliding cradle according to an exemplary implementation of an embodiment of the present invention taken in an obliquely downward direction from above.
Figure 5:
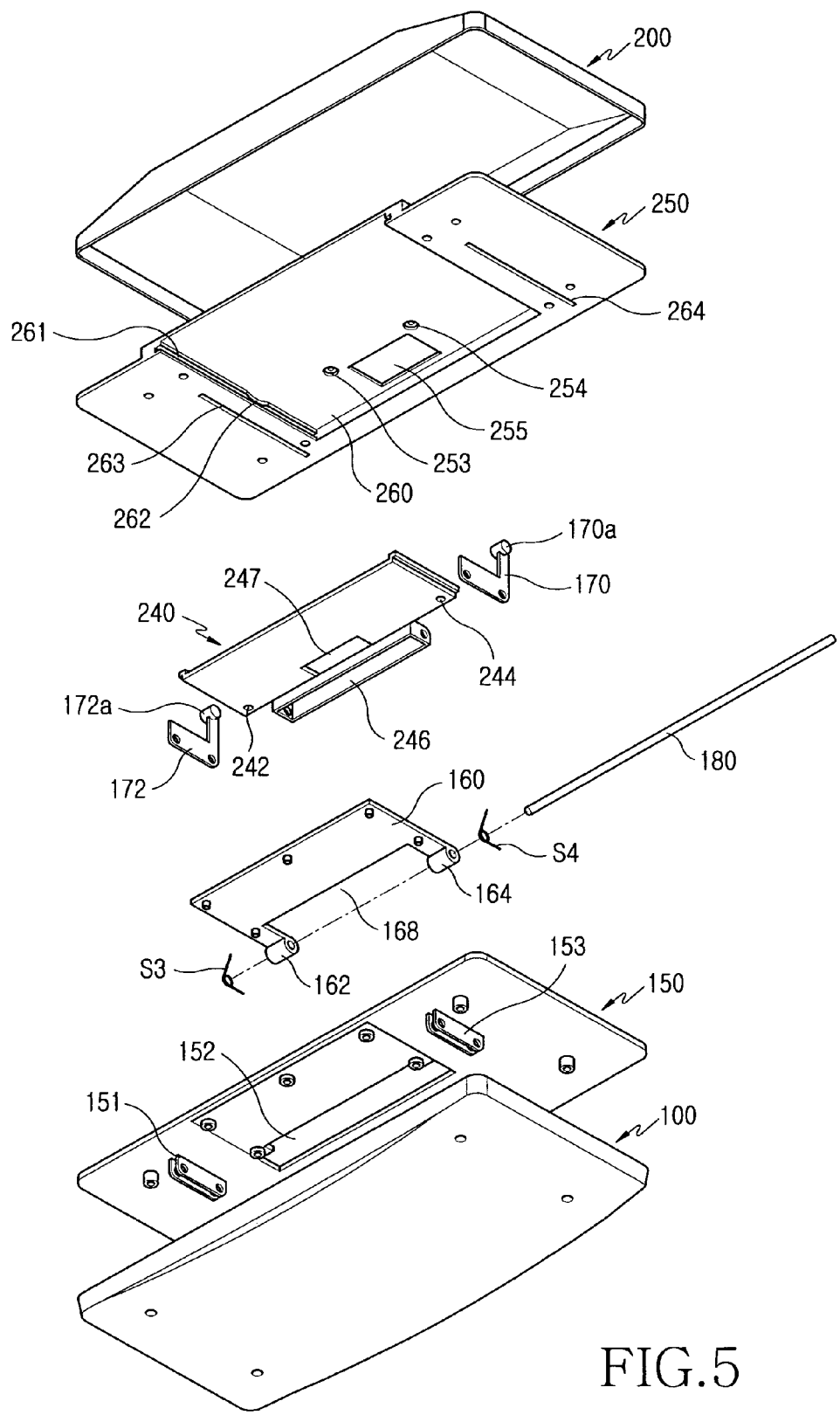
FIG. 5 is an exploded perspective view of a sliding cradle according to an exemplary implementation of an embodiment of the present invention taken in an obliquely upward direction from below.

Referring to FIGS. 4 and 5, the sliding cradle according to exemplary embodiments of the present invention provided in the mobile terminal comprises a first member 150 fastened to the body housing 100, a second member 250 fastened to the sliding and pivotable housing 200, a sliding guide part arranged between the first and second members 150 and 250, a fixture member 160 fastened to the first member, and a pivot control device connected with the first and second members to substantially prevent the sliding and pivotable housing 200 from pivoting during the sliding movement and to enable it to pivot upon completion of the sliding movement. The first and second members 150 and 250 have generally plate-like shapes and are respectively mounted on the top of the body housing 100 and on the bottom of the sliding and pivotable housing 200.

The sliding guide part arranged between the first and second members 150 and 250 guides the sliding movement of the sliding and pivotable housing 200, and is provided with a pivot member 246 for pivoting the second member 250 and thus the sliding and pivotable housing 200 apart from the first member 150. The sliding movement of the sliding and pivotable housing 200 is performed while rested horizontally on the body housing 100 by the sliding guide part. The fixture member 160 is fastened to the first member 150 by means of fastening means (not shown) to face the sliding guide part, and is connected to the pivot member 246 to support a sliding and pivotable member 240.

The sliding guide part comprises a sliding guide depression 260 (shown in FIG. 5) formed in the underside of the second member 250 with a guide rail 261 provided on both edges of the sliding guide depression. The sliding and pivotable member 240 is inserted into the sliding guide depression 260, and the pivot member 246 is integrated with the sliding and pivotable member 240. A pivot mechanism is provided between the sliding and pivotable member 240 and the fixture member 160 and includes the pivot member 246 serving as a hinge device for the sliding and pivotable housing 200.

The sliding guide depression 260 further includes tracking cuts 262 formed on the respective guide rails 261 for accommodating the tracking of first resilient members S1 and S2. The pivot mechanism comprises a pair of first supports 151 and 153 (shown in FIG. 5) formed on the underside of the first member 150 to face each other, the pivot 180 mounted to cross the first supports 151 and 153, the pivot member 246 mounted on the pivot 180 for allowing the sliding and pivotable member 240 to pivot, and a pair of second supports 162 and 164 provided at the fixture member 160 for supporting the pivot 180. The sliding and pivotable member 240 may only be pivoted on the pivot 180, which is supported by the fixture member 160 fixedly mounted on the first member 150.

The first resilient members S1 and S2 provided in the sliding guide part provide a resilient force to supply a closing or an opening force accordingly as the sliding and pivotable housing 200 is within or outside of a given distance. Namely, when the user initially exerts a given force to the sliding and pivotable housing 200, it keeps on sliding automatically by semi-automatic operation of the first resilient members S1 and S2. The first resilient members include a first and a second torsion spring S1 and S2 arranged between the sliding and pivotable member 240 and the second member 250. The first torsion spring S1 has two ends respectively fixed in a fixing hole 242 of the sliding and pivotable member 240 and a fixing hole 253 of the second member 250. Likewise, the second torsion spring S2 has two ends respectively fixed in a fixing hole 244 of the sliding and pivotable member 240 and a fixing hole 254 of the second member 250.

The sliding guide part further includes second resilient members S3 and S4 mounted on the pivot 180 for providing a resilient force to pivot the sliding and pivotable housing 200 by a given angle upon completion of the sliding movement. The second resilient members S3 and S4 are concentrically mounted on the pivot member 246 with their two ends respectively held by the first and second members 150 and 250. The second resilient members include third and fourth torsion springs S3 and S4 mounted concentrically on the pivot 180.

Figure 6A:
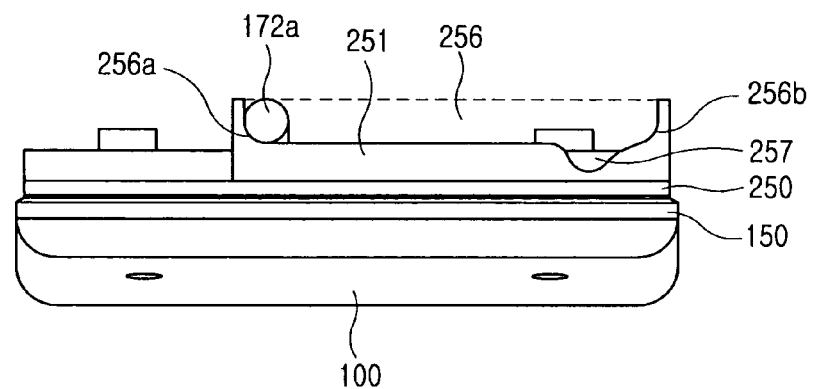
FIGS. 6A to 6C are side elevational views of a sliding cradle according to an exemplary implementation of an embodiment of the present invention showing the steps of sliding and pivoting movements.
Figure 6B:
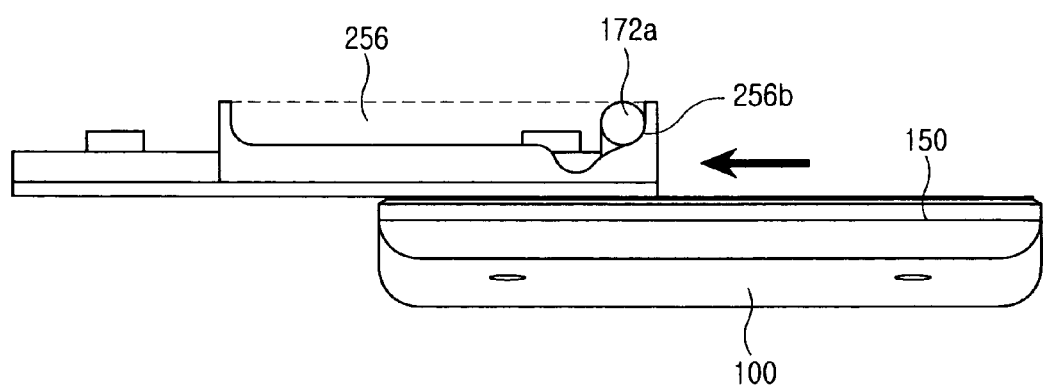
Figure 6C:
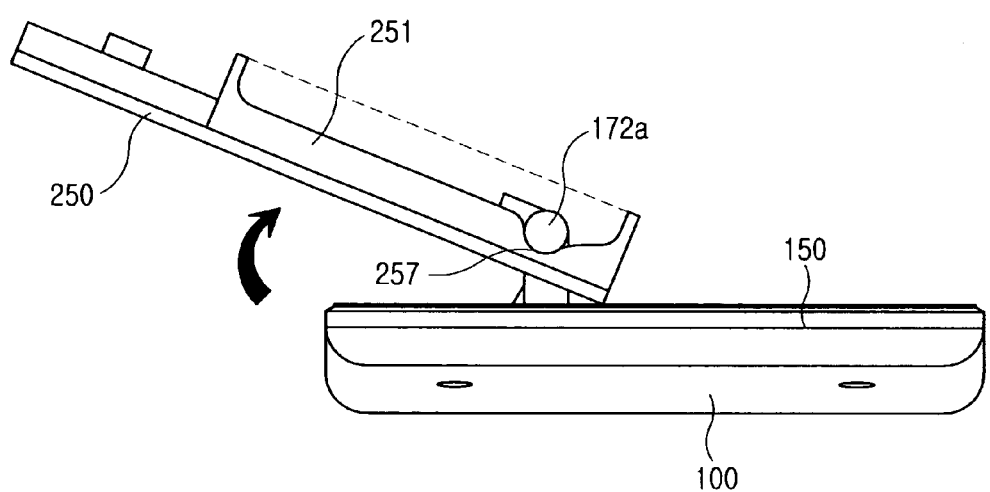

As shown in FIGS. 6A to 6C, the sliding cradle enables the sliding and pivotable housing 200 to be semi-automatically slid relative to the body housing without pivoting, and to pivot by a given angle to a fixed slanting position after completing the sliding movement.

Referring to FIGS. 4 and 6A, the sliding cradle includes a pivot control device, which comprises a pair of first and second retaining guide members 251 and 252 formed on the upper surface of the second member 250 with closed ends, a pair of first and second connecting members 170 and 172 each having two ends, first ends being mounted on the pivot 180 and second ends 170a and 172a being rested on the retaining guide members to slide along them according to the sliding movement of the second member, and an opening structure formed at the retaining guide members 251 and 252 to provide both sliding and pivoting space for the sliding and pivotable housing 200 in cooperation with the other ends of the connecting members. The first and second connecting members 170 and 172 are designed to penetrate respectively the first and second retaining guide members 251 and 252, and the second ends 170a and 172a of the connecting members have substantially cylindrical shapes extending along the axis of the pivot member 246. The first ends of the connecting members 170 and 172 are attached to the first member 150 through first and second slits 154 and 156 formed therein.

Referring to FIG. 6A, the opening structure comprises a first opening 256 facing upwardly along the length of the retaining guide member 251 for allowing the sliding movement of the sliding and pivotable housing 200 in cooperation with the other end 172a of the connecting member 172, and a second opening 257 facing toward the bottom of the retaining guide member 251 for allowing the pivoting of the sliding and pivotable housing 200 after the sliding movement. The second opening 257 is designed to limit the pivoting of the sliding and pivotable housing 200 to a given angle. The first and second openings 256 and 257 communicate. Both ends 256a and 256b of the first opening 256 have curved shapes, and the second opening 257 has a substantially semi-cylindrical shape near the rear end of the retaining guide member 251. The other retaining guide member 252 and the other end 170a of the other connecting member 170 have substantially the same structure for cooperation. Additionally, the first and second members, sliding and pivotable member, and fixture member have respective openings 152, 255, 247, 168 for passing a flexible circuit therethrough.

Figure 7:
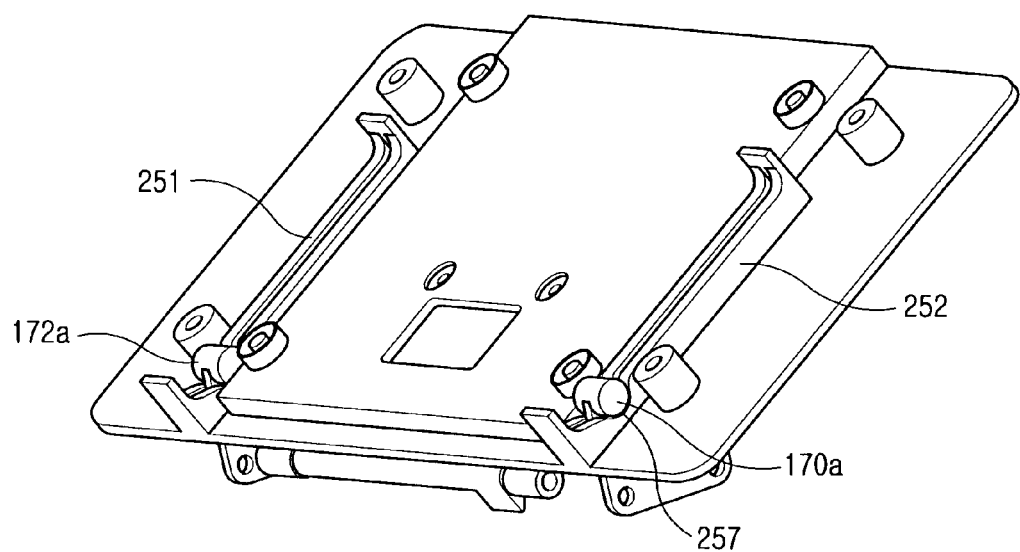
FIG. 7 is a perspective view of the pivoted sliding cradle according to an exemplary embodiment of the present invention.

The operation of the mobile terminal is described in connection with FIGS. 6A to 6C. When the user initially pushes the sliding and pivotable housing 200 to the position shown in FIG. 6A, the sliding and pivotable housing 200 slides along the first opening 256 to the position shown in FIG. 6B. Subsequently, when the sliding and pivotable housing 200 completes the sliding movement, the other ends 170a and 172a of the connecting members enter the second openings 257 of the retaining guide members 251 and 252, so that the second resilient members S3 and S4 exert a resilient force to the second member 250 to pivot the sliding and pivotable housing 200 to the given slanting position as shown in FIG. 6C. The first opening 256 allows the sliding movement and the second opening 257 allows the pivoting movement. The amount of pivoting by the second member 250 is controlled by the shape of the second opening 257, such that modifying the shape of the second opening 257 changes the amount of pivoting possible by the second member 250. Namely, the pivoting amount of the sliding and pivotable housing 200 is increased with the depth of the second opening 257. Additionally, the sliding distance of the second member is adjusted by modifying the shape of the first opening 256. FIG. 7 shows the second member 250 pivoted to a given slanting position with the second end 170a inserted in the second opening 257.

In this embodiment, the sliding and pivotable housing 200 is described as automatically pivoted after having slid by a given distance (100% of the whole sliding interval), but it may be designed to pivot by an additional force externally exerted after completing the sliding movement. Or otherwise, it may be designed to automatically slide by a given distance (about 80% of the whole sliding interval) and then to be pivoted by exerting an additional force after completing the sliding movement of the remaining distance (about 20% of the whole sliding interval) by an additional force externally exerted. It may also be designed both to automatically slide and pivot. The operational force may be applied manually, semi-automatically by using a resilient member like a torsion spring, and fully automatically by using a motor.

As described above, the invention enables the display and the speakers of the mobile terminal to be rested in a slanting position on a table, so that the user may enjoy the visual and acoustic effects more effectively. While the invention has been shown and described with reference to certain exemplary embodiments thereof, it will be understood by those skilled in the art that various changes in form and details may be made therein without departing from the spirit and principle of the invention, the scope of which is defined in the appended claims and their equivalents.

What is claimed is:

1. A sliding cradle provided in a mobile terminal having a body housing, and a sliding and pivotable housing adapted to rest in a slanting position on said body housing after being slid on said body housing, the sliding cradle comprising:
   a first member connected to said body housing;
   a second member connected to said sliding and pivotable housing;
   a sliding guide part arranged between said first and second members to guide the sliding movement of said sliding and pivotable housing, said sliding guide part being provided with a pivot for pivoting said second member apart from said first member;

a fixture member connected to said first member and facing said sliding guide part; and a pivot control device connected to said first and second members to substantially prevent said sliding and pivotable housing from pivoting during the sliding movement and to enable said sliding and pivotable housing to pivot upon completion of the sliding movement.

2. A sliding cradle according to claim 1, wherein said sliding guide part further includes a first resilient member for selectively supplying a closing or an opening force as said sliding and pivotable housing is within or outside of a given distance, respectively.

3. A sliding cradle according to claim 2, wherein said first resilient member comprises first and second ends, the first end being fixedly connected to said sliding guide part, and the second end being connected to said second member, so that said first resilient member moves along a given track according to the sliding movement of said sliding and pivotable housing.

4. A sliding cradle according to claim 1, wherein said sliding guide part further includes a second resilient member mounted on said pivot for providing a resilient force to pivot said sliding and pivotable housing by a given angle upon completion of the sliding movement.

5. A sliding cradle according to claim 1, wherein said sliding guide part comprises:
    a sliding guide depression formed in an underside of said second member with a guide rail provided on both edges of said sliding guide depression;
    a sliding and pivotable member inserted in said sliding guide depression; and
    a pivot means mounted on said sliding and pivotable member.

6. A sliding cradle according to claim 5, wherein said sliding guide depression further includes tracking cuts for accommodating the tracking of said first resilient member.

7. A sliding cradle according to claim 5, wherein said pivot means comprises:
    a pair of first supports formed on an underside of said first member and facing each other;
    said pivot mounted to cross said pair of first supports;
    a pivot member mounted on said pivot for allowing said sliding and pivotable member to pivot; and
    a pair of second supports provided at said fixture member for supporting said pivot.

8. A sliding cradle according to claim 1, wherein said pivot control device comprises:
    a retaining guide means on an upper surface of said second member with closed ends;
    a connecting means having first and second ends, said first end being mounted on said pivot and said second end being rested on said retaining guide means to slide along said retaining guide means according to the sliding movement of said second member; and
    an opening means formed at said retaining guide means to provide both sliding and pivoting space for said sliding and pivotable housing in cooperation with the second end of said connecting means.

9. A sliding cradle according to claim 8, wherein said connecting means comprises a pair of connecting members facing each other, and said retaining guide means comprises a pair of retaining guide members formed on the upper surface of said second member to protrude therethrough and to face each other, said pair of connecting members penetrating respectively said pair of retaining guide members, and the second end of said connecting members having a substantially cylindrical shape along an axis substantially parallel to said pivot.

10. A sliding cradle according to claim 8, wherein said opening means comprises:
    a first opening facing upwardly along a length of said retaining guide means for allowing the sliding movement of said sliding and pivotable housing; and
    a second opening facing toward the bottom of said retaining guide means for allowing the pivoting of said sliding and pivotable housing after the sliding movement.

11. A sliding cradle according to claim 10, wherein said first and second openings communicate, and said second opening has a semi-cylindrical shape near the rear end of said retaining guide means.

12. A sliding cradle according to claim 1, further including a passage opening penetrating successively said first and second members, sliding and pivotable member, and fixture member for passing a flexible circuit therethrough.

* * * * *